United States Patent
Baehrle-Miller et al.

(10) Patent No.: US 9,511,757 B2
(45) Date of Patent: Dec. 6, 2016

(54) METHOD FOR DETERMINING A FAILURE IN A SERVICE OR PARKING BRAKE IN A VEHICLE, REGULATING OR CONTROL UNIT FOR CARRYING OUT THE METHOD, AND PARKING BRAKE HAVING SUCH A REGULATING OR CONTROL UNIT

(75) Inventors: Frank Baehrle-Miller, Schoenaich (DE); Dieter Blattert, Kirchheim/Neckar (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 13/822,237

(22) PCT Filed: Jul. 14, 2011

(86) PCT No.: PCT/EP2011/062032
§ 371 (c)(1),
(2), (4) Date: May 21, 2013

(87) PCT Pub. No.: WO2012/031803
PCT Pub. Date: Mar. 15, 2012

(65) Prior Publication Data
US 2013/0231839 A1  Sep. 5, 2013

(30) Foreign Application Priority Data
Sep. 10, 2010 (DE) .......................... 10 2010 040 573

(51) Int. Cl.
*B60T 17/22* (2006.01)
*B60T 13/58* (2006.01)
*B60T 13/74* (2006.01)

(52) U.S. Cl.
CPC ............ *B60T 17/221* (2013.01); *B60T 13/588* (2013.01); *B60T 13/745* (2013.01); *B60T 13/746* (2013.01); *B60T 17/22* (2013.01)

(58) Field of Classification Search
CPC .... B60T 17/221; B60T 13/588; B60T 13/745; B60T 13/746; B60T 17/22
USPC .................................................. 701/34.4, 70
See application file for complete search history.

(56) References Cited

U.S. PATENT DOCUMENTS

| 6,008,604 | A | 12/1999 | Maisch | |
|---|---|---|---|---|
| 2009/0096281 | A1* | 4/2009 | Rowan et al. | 303/114.1 |
| 2011/0153147 | A1* | 6/2011 | Watanabe et al. | 701/29 |
| 2011/0278105 | A1* | 11/2011 | Maron et al. | 188/72.1 |

(Continued)

FOREIGN PATENT DOCUMENTS

| CN | 1509925 | 12/1999 |
|---|---|---|
| DE | 10 2009 027479 | 1/2011 |

(Continued)

OTHER PUBLICATIONS

EPO english translation JP 11-043038 A and EPO english translation JP 09109876 A.*

*Primary Examiner* — Fadey Jabr
*Assistant Examiner* — Yazan Soofi
(74) *Attorney, Agent, or Firm* — Norton Rose Fulbright US LLP; Gerard Messina

(57) ABSTRACT

In a method for determining a failure in a service or parking brake having an electromotive and a hydraulic brake device for generating a clamping force, an error is detected in the hydraulic brake device if an electromotive characteristic of the electric brake motor is outside an admissible value range.

17 Claims, 3 Drawing Sheets

(56) References Cited

U.S. PATENT DOCUMENTS

2012/0205202 A1* 8/2012 Baehrle-Miller et al. 188/106 P

FOREIGN PATENT DOCUMENTS

| | | |
|---|---|---|
| JP | 9 109876 | 4/1997 |
| JP | 9-109876 | 4/1997 |
| JP | 09109876 A * | 4/1997 |
| JP | 11 043038 | 2/1999 |
| JP | 11043038 A * | 2/1999 |
| JP | 2004-537021 | 12/2004 |
| JP | 2006-22959 | 1/2006 |
| JP | 2007-8198 | 1/2007 |
| JP | 2007-519568 | 7/2007 |
| JP | 2008-174114 | 7/2008 |
| JP | 2010-24307 | 2/2010 |
| JP | 2010-52643 | 3/2010 |
| WO | 2010/024307 A1 | 3/2010 |

* cited by examiner

METHOD FOR DETERMINING A FAILURE IN A SERVICE OR PARKING BRAKE IN A VEHICLE, REGULATING OR CONTROL UNIT FOR CARRYING OUT THE METHOD, AND PARKING BRAKE HAVING SUCH A REGULATING OR CONTROL UNIT

FIELD OF THE INVENTION

The present invention relates to a method for determining a failure in a service or parking brake in a vehicle.

BACKGROUND INFORMATION

Parking brakes which are used to permanently hold a vehicle at a standstill by generating a clamping force are known from the related art. Parking brakes may include an electric brake motor which is used to generate a clamping force directly on the brake piston of the hydraulic vehicle brake. The electric brake motor is dimensioned in such a way that a clamping force may be generated which reliably holds the vehicle up to a defined gradient. In addition to the electromotive clamping force, a clamping force may also be generated via the hydraulic vehicle brake, for example, for gradients which exceed a certain degree.

The precondition for a parking brake to permanently function properly without the risk of component damage is that the hydraulic wheel brakes are not thermally overloaded, e.g., due to intense operation of the vehicle brake during a preceding braking operation. If the parking brake is engaged during fading or boiling of the brake fluid, the brake pads, which are highly stressed thermally, are compressed even more, possibly resulting in permanent damage. Furthermore, there is the risk of the brake pads sticking to the brake disk which may result in the brake pads being destroyed during the subsequent driving off of the vehicle. If a hot brake disk is highly stressed mechanically, it may be damaged in a locally limited manner or entirely.

SUMMARY OF THE INVENTION

An object of the exemplary embodiments and/or exemplary methods of the present invention is to reliably detect failures in a service or parking brake in a vehicle which includes both an electromotive and a hydraulic brake device.

According to the exemplary embodiments and/or exemplary methods of the present invention, this object may be achieved by the features described herein. The further descriptions herein describe advantageous refinements.

The method according to the present invention relates to detecting a failure in a service or parking brake in a vehicle, which includes both an electromotive brake device having an electric brake motor and a hydraulic brake device, a clamping force, which is generated either entirely by the electromotive or the hydraulic brake device or proportionally by both brake devices, being generatable in the parking brake for holding the vehicle at a standstill. The electric brake motor, in particular, has an effect on a brake piston of a hydraulic wheel brake unit which is an integral part of the vehicle brake. The hydraulic brake device of the parking brake belongs to the vehicle brake via which the vehicle is braked during normal vehicle operation.

In order to be able to detect possible failures in the hydraulic brake device which might pose a risk of component damage to the components of the parking brake or the hydraulic brake device, at least one electromotive characteristic of the electric brake motor is examined for exceedance of an admissible value range during the operation of the parking brake. If the examined electromotive characteristic is outside the admissible value range, an error in the hydraulic brake device must be assumed. In this case, a corresponding error signal may be generated which may be displayed to the driver or processed in a different manner. Since the electromotive and the hydraulic brake devices cooperate, it is possible to infer that the failure is in the hydraulic system if only the electromotive characteristic was examined.

At least one electromotive characteristic of the electric brake motor or a variable correlating thereto is examined. The characteristic curve of the power consumption of the electric brake motor is considered as the electromotive characteristic. If the parking brake functions properly, the current characteristic curve of the electric brake motor is at least approximately constant within a defined fluctuation margin as soon as the target clamping force is reached. In contrast, the current characteristic curve continues to rise in the case of a failure of the hydraulic brake device due to missing hydraulic assistance, which may be determined through the exceedance of a current threshold value.

As the electromotive characteristic and thus correlating variable, the rotational speed of the electric brake motor may also be examined which normally assumes a constant value within an admissible fluctuation margin as soon as the target clamping force is reached, but which continues to drop in the case of damage of the hydraulic brake device, which may be detected in that a rotational speed falls below a threshold value.

It is additionally or alternatively also possible to examine the traveled distance of the brake piston which is acted on by the electric brake motor and which usually is an integral part of the hydraulic wheel brake. If a sufficient piston travel is not available, which may be determined by a corresponding threshold value not being reached, there is damage in the hydraulic system. The piston advance speed must, however, have a minimum speed, otherwise, damage must be assumed.

In principle, it is sufficient to examine only one electromotive characteristic or a variable correlating thereto and to infer therefrom damage in the hydraulic system. It may, however, be advantageous to examine multiple variables to minimize the risk of error when detecting a failure, for example.

The examination of whether an error or a failure is present is advantageously carried out during the operation of the hydraulic brake device for generating a clamping force. In this case, there is a significantly determinable influence on the electromotive characteristics by the hydraulic system due to both the electromotive brake device and the hydraulic brake device having an effect on the same brake piston. As a result, failures are easily determinable.

It may be advantageous to operate the hydraulic brake device for generating a hydraulic clamping force for testing purposes as soon as a locking intention is recognized, even if, in principle, reaching a target clamping force may be ensured in the parking brake solely via the electric brake motor. A hydraulic clamping force may, for example, be generated for testing purposes if a characteristic of the hydraulic brake device is outside an admissible value range. The brake disk temperature or the brake fluid temperature, which exceeds an associated threshold value, may, for example, be considered. A hydraulic clamping force may also be generated in the case of wheel brake fading where the vehicle deceleration does not correspond to the braking intention of the driver. The fading is ascertained from a preceding braking operation.

Notwithstanding an operation of the hydraulic clamping force for testing purposes, the hydraulic brake device is also operated during regular operation of the parking brake, insofar as a corresponding triggering condition is met. Parking the vehicle on a gradient which exceeds a threshold value of 20%, for example, comes into consideration. In general, a hydraulic clamping force is additionally generated, insofar as the electromotive clamping force alone is not sufficient to reach the target clamping force.

After the hydraulic brake device for generating a hydraulic clamping force has been operated, a failure may be determined in the hydraulic system via an evaluation of an electromotive characteristic, as described above.

If a failure is detected, an error signal is generated which may be processed in various ways. The failure may be displayed to the driver, in particular visually, acoustically, and/or haptically, in order to make her/him aware of the failure. Additionally or alternatively, it is also possible to initially lock the parking brake according to the driver's intention upon detection of a failure, e.g., an overload of the parking brake, but to immediately release it again after the failure is detected to avoid component damage. It is, however, also possible to keep the parking brake locked, but to prompt the driver to release it manually. It may furthermore be advantageous either to operate the parking brake once again automatically after it has been released as soon as a critical value in the hydraulic system again reaches an uncritical range or to communicate to the driver a corresponding request for the parking brake operation.

The method according to the present invention is executed in a regulating or control unit which is an integral part of the parking brake in the vehicle or communicates with the parking brake or the components of the parking brake. The regulating or control unit may be an integral part of an ESP (electronic stability program) control unit or an additional function on an ESP control unit.

Additional advantages and advantageous embodiments are derived from the other claims, the description of the figures, and the drawings.

DETAILED DESCRIPTION

Figure 1:
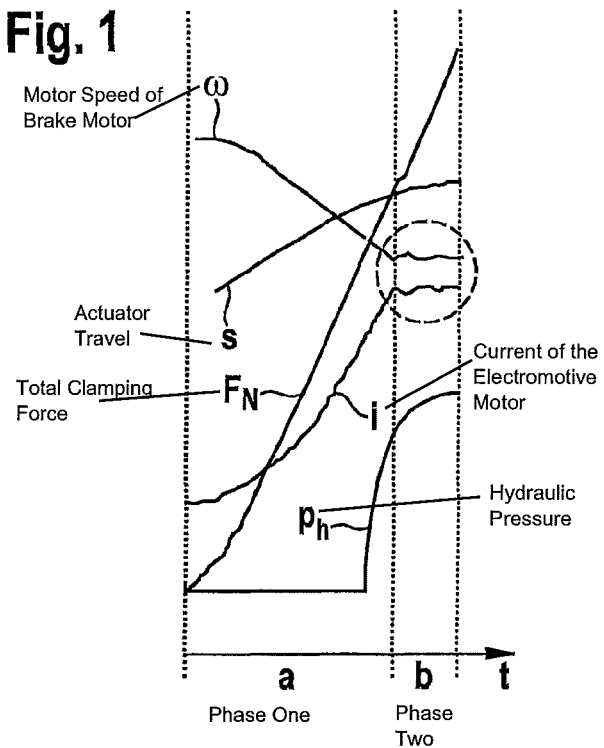
FIG. 1 shows a diagram having a chronological characteristic curve of electromotive characteristics as well as of the hydraulic pressure in a parking brake during a proper functional state of the parking brake.
Figure 2:
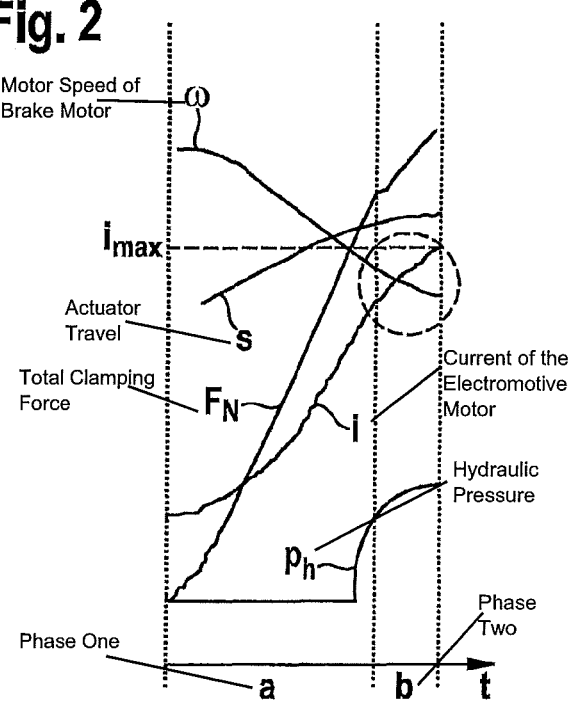
FIG. 2 shows a diagram corresponding to FIG. 1, but illustrated for the case of a failure in the hydraulic system.

In FIGS. 1 and 2, the characteristic curve of various characteristics of a parking brake in a vehicle is illustrated chronologically. Hydraulic pressure $p_h$ of a hydraulic brake device, current i of an electric brake motor, motor speed $\omega$ of the brake motor, actuator travel s of the brake motor, as well as total clamping force $F_N$, which is composed of a portion of the electric brake motor and a portion of the hydraulic brake device, are plotted. FIGS. 1 and 2 each show two chronologically consecutive phases a and b; phase a indicates the solely electromechanical force buildup and phase b indicates the electrohydraulic force buildup until target clamping force $F_N$ is reached.

In the regular case according to FIG. 1, current characteristic curve i as well as motor speed $\omega$ of the electric brake motor are on an approximately constant level within a relatively narrow admissible value range during phase b as soon as the target clamping force is reached. In the case of a failure of the hydraulic brake device according to FIG. 2, current characteristic curve i, however, continues to rise during phase b as well and reaches a maximum $i_{max}$ which is above an admissible current threshold value. Motor speed $\omega$, however, continues to drop during phase b and falls below a lower admissible threshold value. It is also apparent from FIG. 2 that pressure characteristic curve $p_h$ of the hydraulic brake device moves on a lower level during phase b than in the regular case according to FIG. 1, i.e., the pressure generation is limited.

Figure 3:
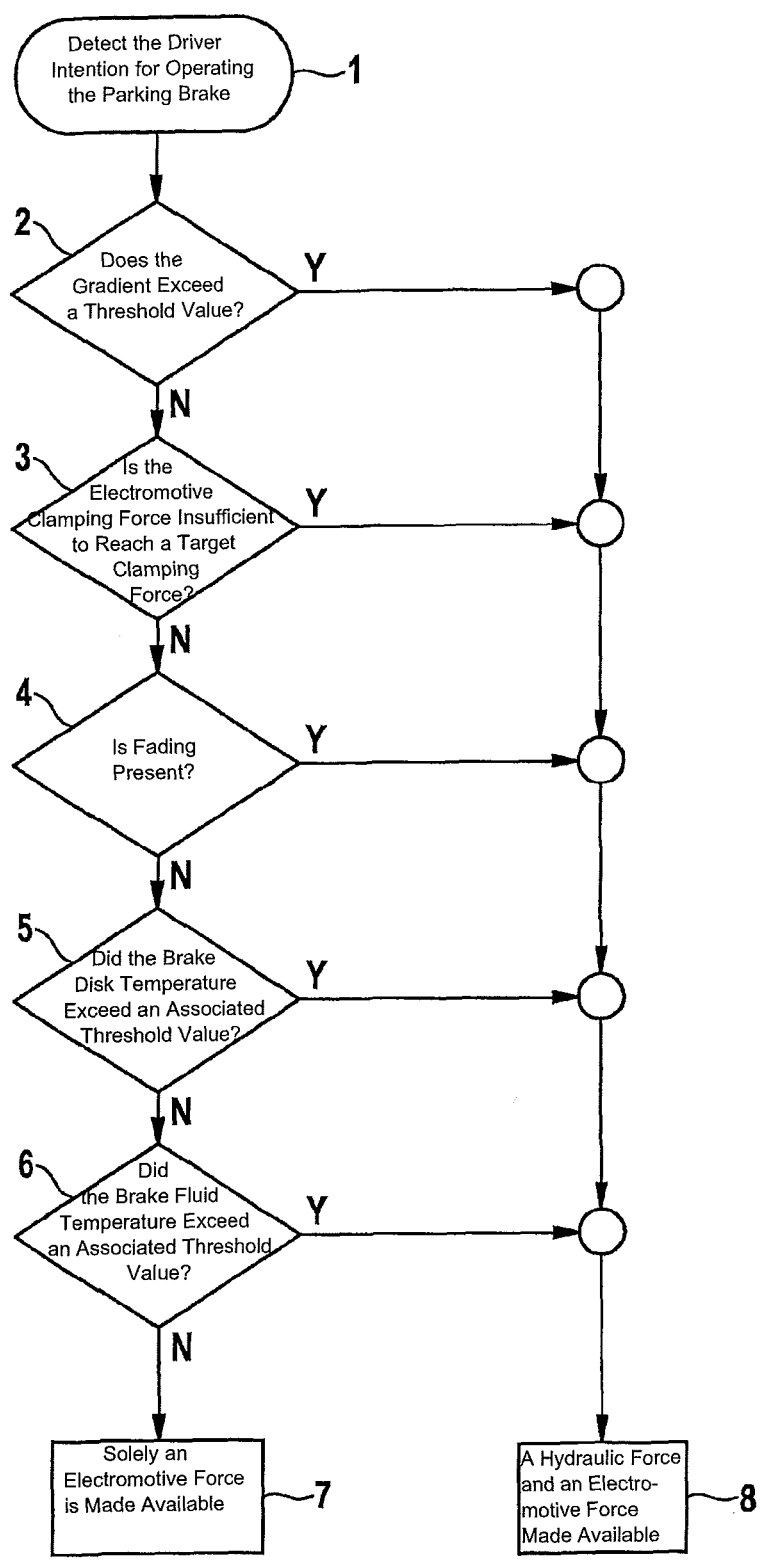
FIG. 3 shows a flow chart for carrying out the method for determining a failure in the parking brake.
Figure 4:
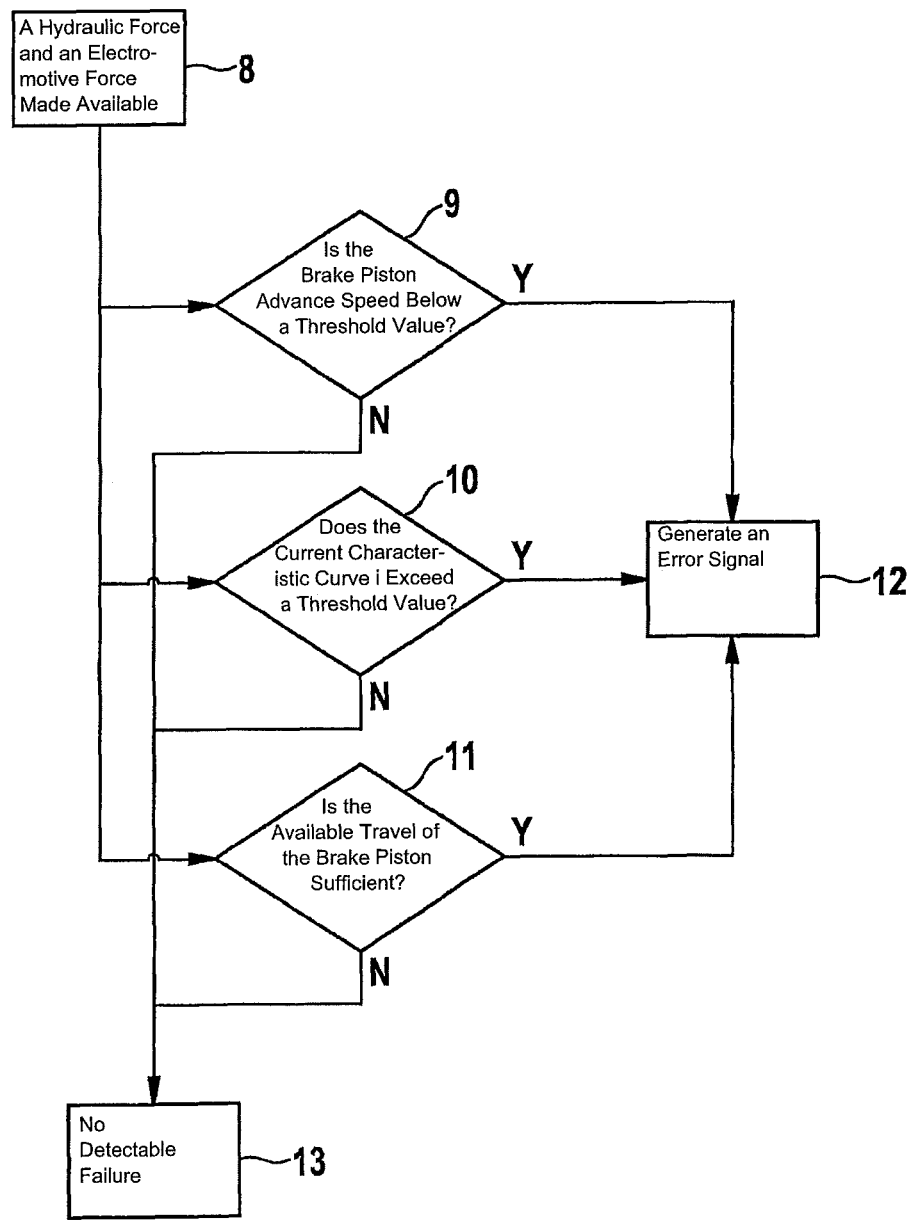
FIG. 4 shows the continuation of the flow chart according to FIG. 3.

FIGS. 3 and 4 show a flow chart for carrying out the method via which a failure in a parking brake may be detected. Method step 1 represents the locking intention of the driver. In subsequent method steps 2 through 6, one query is carried out in each case of whether the hydraulic brake device should be operated in the parking brake after the driver's intention for operating the parking brake has been detected. This is the case if one of the queries according to steps 2 through 6 applies so that the Yes branch ("Y") is followed to method step 8 in which the hydraulic brake device is operated and a hydraulic clamping force is generated. Otherwise, the No branch ("N") is followed to method step 7, in queries 2 through 6, according to which solely an electromotive clamping force is made available by the operation of the electromotive brake device. If one of the queries according to steps 2 through 6 applies and the process is branched to method step 8, a hydraulic clamping force is also generated in addition to the electromotive clamping force.

Method steps 2 and 3 represent a standard case in which it is checked whether the gradient exceeds a threshold value (method step 2) or the electromotive clamping force is not sufficient to reach a target clamping force (method step 3). If one of the conditions is met, the Yes branch is followed to method step 8 and a hydraulic clamping force is generated in addition to the electromotive clamping force.

Method steps 4 through 6 represent a failure in the system which, however, is not necessarily attributable to damage in the hydraulic brake device. According to method step 4, it is queried whether fading is present, for which the vehicle deceleration from a preceding braking operation did not correspond to the braking intention of the driver. If this applies, i.e., it was not possible to implement the braking intention of the driver in a desirable manner, the Yes branch is followed to method step 8.

In method step 5, it is queried whether the brake disk temperature exceeds an associated threshold value. In this case, too, a failure is present and the Yes branch is followed to step 8.

In method step 6, it is queried whether the brake fluid temperature exceeds an associated threshold value. If this is the case, the Yes branch is followed to method step 8.

FIG. 4 represents a continuation of the method and starts at method step 8, according to which a hydraulic braking force is provided in addition to the electromotive braking force. The queries according to steps 9 through 11 are used to check whether a failure is present in the hydraulic brake device. This is queried based on an electromotive characteristic.

According to method step 9, it is checked whether the brake piston advance speed is below a threshold value. If this is the case, the Yes branch is followed to method step 12 in which an error signal is generated. Otherwise, the No branch is followed to method step 13; at least from the query according to method step 9, there is no detectable failure of the hydraulic brake device so that it is possible to properly carry out the locking function in the parking brake.

In method step 10, which, just as method step 11, is carried out additionally or in parallel to the query according to method step 9, it is queried whether current characteristic curve i of the electric brake motor exceeds a threshold value. If this is the case, a failure is present and the process is continued to method step 12, or otherwise to method step 13.

In method step 11, it is queried whether the available travel of the brake piston is not sufficient. If this is the case, a failure is also present and the Yes branch is followed to method step 12, or otherwise to method step 13.

In method step 12, an error signal is generated which is displayed to the driver. Additionally, automatic intervention into the parking brake is possible, for example, in such a way that the already locked parking brake is automatically released after the recognition of the failure.

What is claimed is:

1. A method for determining a failure in at least one of a service brake or parking brake having an electromotive brake device and a hydraulic brake device, the method comprising:
    monitoring an electromotive characteristic of an electric brake motor of the electromotive brake device while at least one of the electromotive brake device and the hydraulic brake device generates a clamping force; and
    detecting an error in the hydraulic brake device if the electromotive characteristic or a variable correlating thereto is outside an admissible value range,
    wherein the admissible value range includes values between a minimum acceptable electromotive characteristic value and a maximum acceptable electromotive characteristic value;
    wherein the error is detected if any one of:
    (i) the electromotive characteristic is an advance speed of a brake piston, the admissible value range is above a threshold brake piston advance speed value, and the monitored electromotive characteristic or the variable correlating thereto is outside the admissible value range;
    (ii) the electromotive characteristic is a current characteristic curve, the admissible value range is below a threshold current characteristic curve value, and the monitored electromotive characteristic or the variable correlating thereto is outside the admissible value range; and
    (iii) the electromotive characteristic is a traveled distance of the brake piston, the admissible value range is above a threshold traveled brake piston distance value, and the monitored electromotive characteristic or the variable correlating thereto is outside the admissible value range;
    wherein one of: (i) the parking brake is automatically released upon detection of the error in the hydraulic brake device, (ii) a driver is alerted one of visually, acoustically, and haptically, upon detection of the error in the hydraulic brake device, or (iii) upon detection of the error, an error signal is generated which is displayed to the driver or is processed in a different manner.

2. The method of claim 1, wherein a current characteristic curve is examined as the electromotive characteristic of the electric brake motor.

3. The method of claim 1, wherein a rotational speed is examined as the electromotive characteristic of the electric brake motor.

4. The method of claim 1, wherein a traveled distance of a brake piston is examined as the electromotive characteristic of the electric brake motor.

5. The method of claim 1, wherein an advance speed of a brake piston is examined as the electromotive characteristic of the electric brake motor.

6. The method of claim 1, wherein the detected error is evaluated as to whether not a failure is present during an operation of the hydraulic brake device.

7. The method of claim 6, wherein the operation of the hydraulic brake device is triggered if a characteristic of the hydraulic brake device is outside an admissible value range.

8. The method of claim 6, wherein the operation of the hydraulic brake device is triggered if a vehicle deceleration from a preceding brake operation did not correspond to a braking intention of a driver.

9. The method of claim 6, wherein the operation of the hydraulic brake device is triggered if it is not possible to make available a target clamping force in the parking brake solely via the electromotive brake device.

10. The method of claim 1, wherein the parking brake is automatically released upon detection of the error in the hydraulic brake device.

11. The method of claim 1, wherein the parking brake remains locked and a driver is sent a request to release the parking brake upon detection of the error in the hydraulic brake device.

12. The method of claim 1, wherein the operation of the hydraulic brake device is triggered if one of a brake disk temperature and a brake fluid temperature exceeds a respective threshold value.

13. The method of claim 1, wherein the operation of the hydraulic brake device is triggered if a gradient on which a vehicle having the parking brake rests exceeds a threshold value.

14. The method of claim 1, wherein a driver is alerted one of visually, acoustically, and haptically, upon detection of the error in the hydraulic brake device.

15. A control unit comprising:
    an arrangement to determine a failure in at least one of a service or a parking brake having an electromotive brake device and a hydraulic brake device, by:
    monitoring an electromotive characteristic of an electric brake motor of the electromotive brake device while at least one of the electromotive brake device and the hydraulic brake device generates a clamping force; and
    detecting an error in the hydraulic brake device if the electromotive characteristic or a variable correlating thereto is outside an admissible value range,
    wherein the admissible value range includes values between a minimum acceptable electromotive characteristic value and a maximum acceptable electromotive characteristic value; wherein the error is detected if any one of:
    (i) the electromotive characteristic is an advance speed of a brake piston, the admissible value range is above a threshold brake piston advance speed value, and the monitored electromotive characteristic or the variable correlating thereto is outside the admissible value range;

(ii) the electromotive characteristic is a current characteristic curve, the admissible value range is below a threshold current characteristic curve value, and the monitored electromotive characteristic or the variable correlating thereto is outside the admissible value range; and (iii) the electromotive characteristic is a traveled distance of the brake piston, the admissible value range is above a threshold traveled brake piston distance value, and the monitored electromotive characteristic or the variable correlating thereto is outside the admissible value range;

wherein one of: (i) the parking brake is automatically released upon detection of the error in the hydraulic brake device, (ii) a driver is alerted one of visually, acoustically, and haptically, upon detection of the error in the hydraulic brake device, or (iii) upon detection of the error, an error signal is generated which is displayed to the driver or is processed in a different manner.

16. A parking brake in a vehicle, comprising:

a control unit, including:

an arrangement to determine a failure in at least one of a service or a parking brake having an electromotive brake device and a hydraulic brake device, by:

monitoring an electromotive characteristic of an electric brake motor of the electromotive brake device while at least one of the electromotive brake device and the hydraulic brake device generates a clamping force; and detecting an error in the hydraulic brake device if the electromotive characteristic or a variable correlating thereto is outside an admissible value range, wherein the admissible value range includes values between a minimum acceptable electromotive characteristic value and a maximum acceptable; electromotive characteristic value;

wherein the error is detected if any one of:

(i) the electromotive characteristic is an advance speed of a brake piston, the admissible value range is above a threshold brake piston advance speed value, and the monitored electromotive characteristic or the variable correlating thereto is outside the admissible value range;

(ii) the electromotive characteristic is a current characteristic curve, the admissible value range is below a threshold current characteristic curve value, and the monitored electromotive characteristic or the variable correlating thereto is outside the admissible value range; and (iii) the electromotive characteristic is a traveled distance of the brake piston, the admissible value range is above a threshold traveled brake piston distance value, and the monitored electromotive characteristic or the variable correlating thereto is outside the admissible value range;

wherein one of: (i) the parking brake is automatically released upon detection of the error in the hydraulic brake device, (ii) a driver is alerted one of visually, acoustically, and haptically, upon detection of the error in the hydraulic brake device, or (iii) upon detection of the error, an error signal is generated which is displayed to the driver or is processed in a different manner.

17. The method of claim 1, wherein the electromotive brake device is configured to exert an electromotive clamping force and the hydraulic brake device is configured to exert a hydraulic clamping force, and wherein the sum of the electromotive clamping force and the hydraulic clamping force is a target clamping force.

* * * * *